Figure 1:
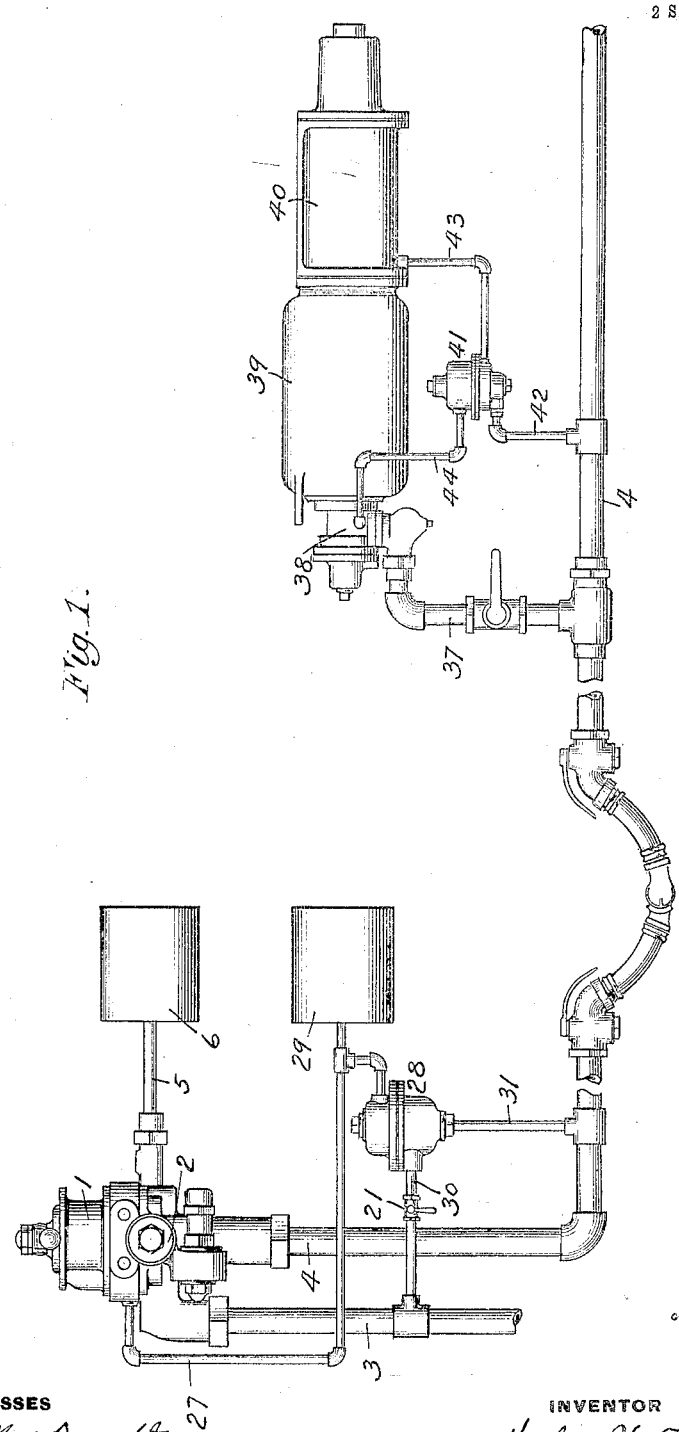

No. 834,342. PATENTED OCT. 30, 1906.
W. V. TURNER.
FLUID PRESSURE BRAKE.
APPLICATION FILED SEPT. 26, 1903.

2 SHEETS—SHEET 1.

WITNESSES
Jas. B. MacDonald.
R. Custer

INVENTOR
Walter V. Turner
By E. Wright Att'y.

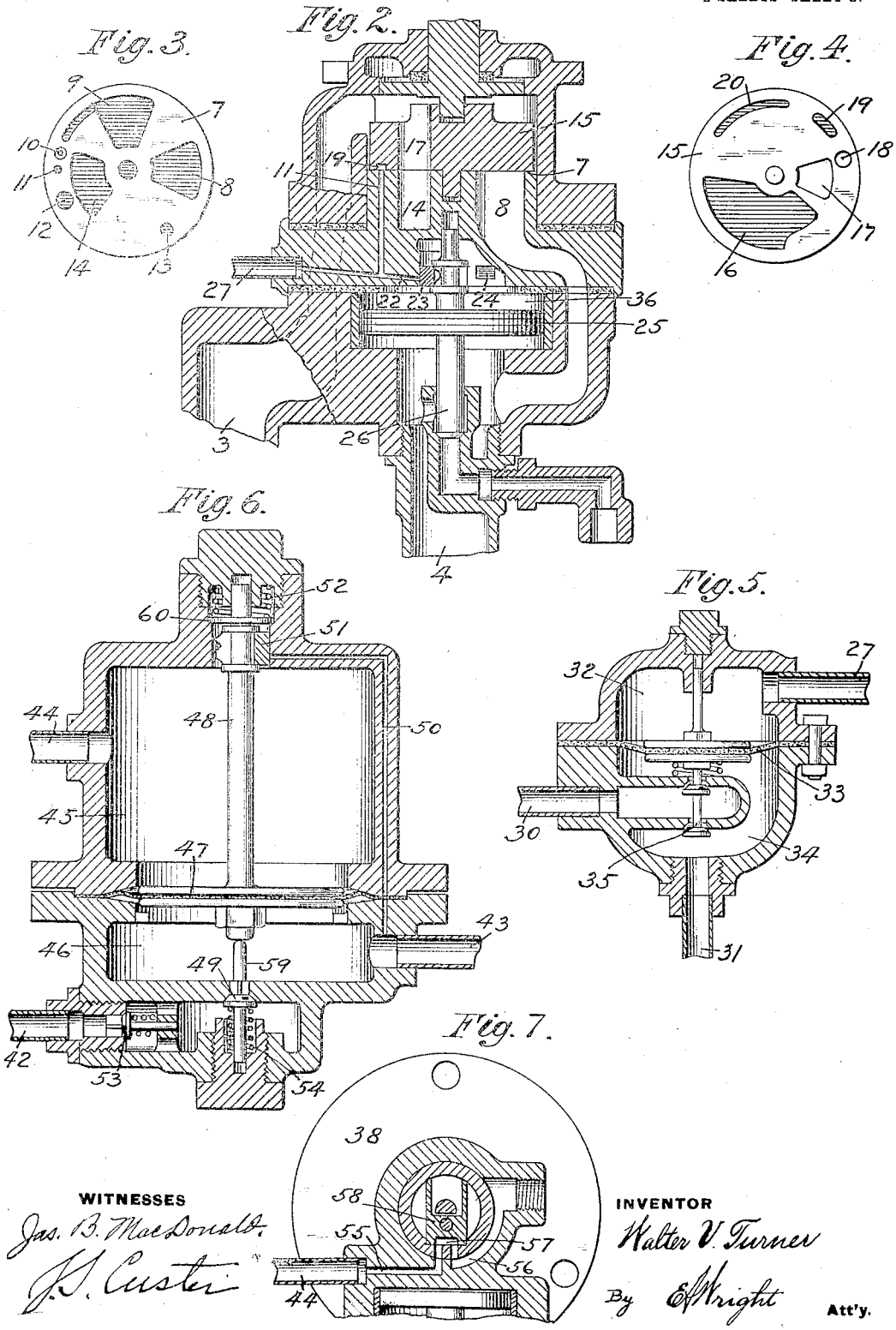

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

No. 834,342.      Specification of Letters Patent.      Patented Oct. 30, 1906.

Application filed September 26, 1903. Serial No. 174,707.

*To all whom it may concern:*

Be it known that I, WALTER V. TURNER, a citizen of the United States, residing at Wilkinsburg, in the county of Allegheny and State of Pennsylvania, have invented a certain new and useful Improvement in Fluid-Pressure Brakes, of which improvement the following is a specification.

This invention relates to fluid-pressure brakes, and has for its object to provide improved means for maintaining the train-line pressure while the brakes remain applied and also for maintaining the pressure in the brake-cylinder, thereby compensating for all leakage both in the train-pipe and in the brake-cylinder.

With the present standard automatic air-brake system when the brakes are applied by making a reduction in train-pipe pressure in the usual way and the engineers' brake-valve is then placed in lap position there is no means for supplying the train-line with air under pressure to compensate for the usual leakage. Consequently when the brakes are held applied for any length of time, as when descending long grades, such train-pipe leakage causes further action of the triple valves and a correspondingly-greater braking pressure, which may become greater than desired and necessitate a release and reapplication perhaps several times in descending the grade, thereby wasting a large amount of compressed air; or, again, it may happen that, owing to the leakage in the brake-cylinders, frequent reductions become necessary to keep up the brake-cylinder pressure to a point sufficient to properly control the speed of the train, thereby depleting the auxiliary-reservoir pressure to the point of equalization, after which it becomes necessary to release the brakes in order to recharge the auxiliary reservoirs. This brings about a very dangerous condition, since during the time required for recharging with the brakes released a train descending a long heavy grade may gain such headway as to be beyond control.

The first part of my invention, therefore, comprises means whereby the supply of air under pressure to the train-line may be maintained while the brakes remain applied, and a second part of the invention consists in means for supplying air from the train-pipe or other source to the brake-cylinder while the brakes are applied, whereby all leakage is compensated for, and any desired pressure may be constantly maintained in the brake-cylinder for any length of time.

In the accompanying drawings, Figure 1 is a diagrammatic illustration of the standard Westinghouse automatic air-brake system for a locomotive and one car, showing my improvements applied thereto; Fig. 2, a broken vertical section through an engineer's brake-valve constructed in accordance with my invention; Fig. 3, a plan view of the rotary-valve seat; Fig. 4, an inverted plan view of the rotary-valve face; Fig. 5, a vertical section of one form of regulating-valve device which may be used for controlling the supply of air from the main reservoir to the train-pipe; Fig. 6, a central vertical section of my improved valve device for controlling the supply of air from the train-pipe to the brake-cylinder; and Fig. 7, a transverse section of a portion of the triple-valve device, showing ports coöperating with one form of my invention.

According to the construction as shown in the drawings the locomotive equipment comprises the engineer's brake-valve 1, having a standard feed-valve device 2 attached thereto and connected to the main reservoir-pipe 3, the train-pipe 4, and by means of pipe 5 with the equalizing-reservoir 6 in the usual manner.

The brake-valve, which is shown more particularly in Figs. 2, 3, and 4, may be of standard construction, except as to certain additional features hereinafter more fully described, and comprises a rotary-valve seat 7, having the usual ports, as follows: 8, leading to the train-pipe; 9, leading to the exhaust; 10, preliminary-discharge port leading to chamber 36 above the equalizing-piston 25; 12, feed-port, leading to the feed-valve device; 14, large cavity in valve-seat, and 13 equalizing-port leading to chamber 36. In addition to these ports I provide a port 11, located near the preliminary-discharge port 10 and connected with port 22, which leads from the chamber 36 of the equalizing-reservoir to pipe 27, communicating with the regulating-chamber 32 of the valve device 28. The port 22 is controlled by a small slide-valve 23, operated by the movable abutment or equalizing-piston 25, which also operates the equalizing discharge-valve 26 in the usual way. Chamber 36 communicates in the ordinary manner through port 24 and pipe 5 with the equalizing-reservoir 6, forming an enlargement of said chamber.

As shown in Fig. 4, the main rotary valve 15 is provided with the usual ports 17 18, large cavity 16, groove 20, and the additional groove or small cavity 19, adapted to connect ports 10 and 11 in the valve-seat when the valve is placed in running position. The regulating-valve device 28 comprises a casing containing the two chambers 32 and 34, separated by the diaphragm 33, the stem of which carries the regulating-valve 35, which controls the flow from the main reservoir-pipe 3 through pipe 30 to pipe 31, leading to the train-pipe 4.

As thus far described the operation of this part of my invention is as follows: The train-pipe being charged with air under pressure and the rotary valve placed in running position, compressed air from the main reservoir-pipe 3 will be supplied, through ports 18 and 12, to the feed-valve device 2 and thence to the train-pipe and the equalizing-reservoir in the usual way. At the same time the ports 10 and 11 are connected by means of cavity 19 in the rotary valve, so that the equalizing-reservoir chamber is in communication with the regulating-chamber 32 through pipe 27, thereby maintaining the pressures of the train-pipe and regulating-chamber equal. When a reduction of train-pipe pressure is made for a service application of the brakes, the rotary valve 15 is turned so that the cavity 20 connects the preliminary-discharge port 10, but not port 11, with the exhaust-port 9, thus reducing the pressure in the equalizing-reservoir and causing the upward movement of the equalizing-piston 25 and discharge-valve 26 in the usual manner. At the same time that the piston rises to open valve 26 it also moves the small slide-valve 23 to open port 22, so that the regulating-chamber then communicates with the equalizing-reservoir, and the pressure therein is reduced at the same time and to the same degree as that of the equalizing-reservoir, the rotary valve being turned to lap position with all ports closed when the desired amount of reduction has been made in the equalizing-reservoir. When the discharge-valve 26 closes, the valve 23 is also closed, and the air under pressure in the regulating-chamber is thereby sealed up at the same degree of pressure as that of the train-pipe at the time the discharge-valve closes. This pressure, therefore, is held constant in chamber 32 on the diaphragm 33, so that any leakage of the train-pipe pressure which acts on the under side of the diaphragm will cause the opening of the regulating-valve 35, thereby admitting a supply of air from the main reservoir sufficient to compensate for all such leakage and maintain the train-pipe pressure constant while the brakes remain applied and with the brake-valve in lap position. The brakes may be released at any time by moving the rotary to full release position and to running position in the usual manner, at which time the normal train-pipe pressure is again restored in the equalizing-reservoir and regulating-chamber, as above described. When the brake-valve is turned to emergency position, the cavity 20 connects both ports 10 and 11 with the exhaust-port 9, so that the regulating-chamber and equalizing-reservoir will both be vented to the atmosphere at the same time that the train-pipe is exhausting directly to the atmosphere through port 8, cavity 16, and exhaust-port 9. In case of an emergency application of the brakes, caused by a burst hose or a break in two of the train, the cock 21 in pipe 30 may be closed to prevent the escape of air from the main reservoir.

The usual car equipment comprises a branch pipe 37, triple-valve device 38, auxiliary reservoir 39, and brake-cylinder 40, and it is to this portion of the apparatus that the second part of my invention relates. Having means for maintaining the train-pipe pressure, it is clear that a supply of air may be taken from the train-pipe for supplying the leakage from the brake-cylinder, and according to this feature of my improvement I provide a brake-cylinder-maintaining valve device 41, having pipe connections, 42 with the train-pipe, 43 with the brake-cylinder, and 44 with the triple-valve device, and operated automatically by brake-cylinder pressure to control the supply of air from the train-pipe to the brake-cylinder while the brakes remain applied, thus compensating for all brake-cylinder leakage and maintaining the pressure therein constant at whatever degree desired. In Fig. 6 I have shown one form of such valve device comprising a casing having two chambers 45 and 46, separated by a diaphragm 47, provided with the stem 48, which operates a valve 51, controlling an equalizing-passage 50 around the diaphragm from one chamber to the other, the chamber 46 being in open communication with pipe 43 and the brake-cylinder, while chamber 45 is connected to the pipe 44, leading to the triple-valve device. The diaphragm-stem also bears upon the stem 59 of a valve 49, which is normally seated by a spring 54 and controls admission of air from the train-pipe and pipe 42 to the chamber 46 and the brake-cylinder, a check-valve 53 being located in the pipe connection to prevent backflow. In the triple-valve device 38 an additional port 55, leading from the pipe 44, is adapted to communicate with the exhaust-cavity 57 of the slide-valve 58, and thus with the exhaust-port 56 when the slide-valve is in its release position. When an application of the brakes is made and the brake-cylinder is supplied with air from the auxiliary reservoir at the desired degree of pressure, the slide-valve 58 of the triple-valve devices moves from its release position to service and lap positions in the usual way, thereby closing the port 55 and cutting off communication from the maintaining-chamber 45 to the atmosphere. At the same time the pressure from the brake-cylinder in chamber 46 raises diaphragm 47 and opens the valve 51, thereby equalizing the brake-cylinder pressure in chambers 45 and 46 on the opposite sides of the diaphragm, a light spring 52 and washer 60 being used to return the diaphragm and stem to normal position with valve 51 closed. In this normal position the diaphragm-stem engages the end of the stem 59 of the regulating-valve 49, which is held closed by the spring 54 and the train-pipe pressure, and the spring-washer 60 is preferably arranged to rest upon a shoulder of the casing in this position, so as not to exert any pressure tending to open the valve 49. With the parts in this position and the brake applied should there be any leakage from the brake-cylinder, causing a diminishing of the pressure in chamber 46, the diaphragm will then move down under the constant pressure which is sealed in the maintaining-chamber 45, thereby opening valve 49 and admitting sufficient fluid under pressure from the pipe 42 and the train-pipe to supply such leakage and maintain the brake-cylinder pressure constant and equal to that contained in chamber 45. By this means the brakes may be held on as long as desired and the brake-cylinder pressure maintained constant without depleting the auxiliary reservoirs. When the brakes are released by the triple valve moving to release position in the usual way, the air in chamber 46 is released to the atmosphere with that of the brake-cylinder through the ordinary brake-cylinder and exhaust-ports of the triple valve, and at the same time the air from chamber 45 is released through pipe 44 and ports 55, 57, and 56 of the triple valve. In case of an application of the brakes due to a burst hose or other accident the check-valve 53 prevents a release of the brake-cylinder pressure through the empty train-pipe.

It will now be evident that the second part of my invention, relating to maintaining the brake-cylinder pressure, may be employed in connection with any form of device by which the train-pipe pressure is maintained or fed up during the time that the brakes remain applied, and it will also be obvious that my improved means for maintaining the train-pipe pressure may be used either alone by itself or in connection with any other form of valve device for maintaining the brake-cylinder pressure as desired.

Having now described my invention, what I claim as new, and desire to secure by Letters Patent, is—

1. In a fluid-pressure brake, the combination with a train-pipe and a movable abutment subject to opposing fluid-pressures for controlling the discharge from the train-pipe, of means operated by the opposing pressures of the train-pipe and a regulating-chamber for controlling the supply of fluid to the train-pipe, and means operated by the movable abutment for controlling the pressure in said regulating-chamber.

2. In a fluid-pressure brake, the combination with a train-pipe and a movable abutment operated by the opposing fluid-pressures of the train-pipe and a reservoir for controlling the discharge from the train-pipe, of a valve for controlling the supply of fluid to the train-pipe, a diaphragm subject to the opposing pressures of the train-pipe and a regulating-chamber for operating said valve, and means operated by the movable abutment for controlling the pressure in said regulating-chamber.

3. In a fluid-pressure brake, the combination with a train-pipe and a movable abutment operated by opposing fluid-pressures for controlling the discharge from the train-pipe, of a valve for controlling the supply of fluid to the train-pipe, a regulating-chamber and means operated by the pressure therein for controlling said valve, and a valve operated by the movable abutment for reducing the pressure in said regulating-chamber.

4. In a fluid-pressure brake, the combination with a train-pipe and a movable abutment operated by opposing fluid-pressures for controlling the discharge from the train-pipe, of a valve for controlling the supply of fluid to the train-pipe, a regulating-chamber and means operated by the pressure therein for controlling said valve, means for supplying fluid under pressure to said regulating-chamber, and a valve operated by the movable abutment for reducing the pressure in the regulating-chamber.

5. In a fluid-pressure brake, the combination with a main manually-operated valve, a train-pipe, a reservoir and a movable abutment subject to the opposing pressures of the train-pipe and the reservoir for controlling the discharge from the train-pipe, of a regulating-chamber and means operated by the pressure therein for controlling the supply of fluid to the train-pipe, means operated by the main valve for supplying fluid to the regulating-chamber and a valve operated by the movable abutment for reducing the pressure in said chamber.

6. In a fluid-pressure brake, the combination with a train-pipe, a reservoir and a movable abutment subject to the opposing pressures of the train-pipe and reservoir for controlling the discharge from the train-pipe, of a regulating-chamber and means operated the pressure therein for controlling the supply of fluid to the train-pipe, a main valve for varying the pressure on one side of said movable abutment and for supplying fluid to the regulating-chamber, and a valve operated by the movable abutment for reducing the pressure in said chamber.

7. In a fluid-pressure brake, the combination with a train-pipe, an equalizing-reservoir, a movable abutment subject to the opposing pressures of the train-pipe and equalizing-reservoir for controlling the discharge from the train-pipe, and a main valve for varying the pressure in said reservoir and train-pipe, of a regulating-chamber and means operated by the pressure therein for controlling the supply of fluid to the train-pipe, and a valve operated by said movable abutment for controlling the pressure in said regulating-chamber.

8. In a fluid-pressure brake, the combination with a train-pipe, an equalizing-reservoir, a movable abutment subject to the opposing pressures of the train-pipe and equalizing-reservoir for controlling the discharge from the train-pipe, and a main valve for varying the pressure in said reservoir and train-pipe, of a regulating-chamber and means operated by the pressure therein for controlling the supply of fluid to the train-pipe, and a valve-operated by said movable abutment for controlling communication between the regulating-chamber and said equalizing-reservoir.

9. In a fluid-pressure brake, the combination with means for supplying fluid under pressure to the train-pipe while the brakes are applied, of a valve device operated by a reduction of brake-cylinder pressure below the amount determined in making the application of the brakes for opening communication from the train-pipe to the brake-cylinder.

10. In a fluid-pressure brake, the combination with a train-pipe, auxiliary reservoir, triple valve, and brake-cylinder, of a valve device operated by a reduction of brake-cylinder pressure below the amount determined in making the application of the brakes for opening communication from the train-pipe to the brake-cylinder.

11. In a fluid-pressure brake, the combination with a train-pipe, auxiliary reservoir, triple valve, and brake-cylinder, of a maintaining-chamber and means operated by the pressure in said chamber for controlling the supply of fluid to the brake-cylinder while the brakes are applied.

12. In a fluid-pressure brake, the combination with a train-pipe, auxiliary reservoir, triple valve, and brake-cylinder, of a maintaining-chamber and means subject to the opposing pressures of the brake-cylinder and such chamber for controlling the supply of fluid to the brake-cylinder while the brakes are applied.

13. In a fluid-pressure brake, the combination with a train-pipe, auxiliary reservoir, triple valve, and brake-cylinder, of a valve for controlling the supply of fluid to the brake-cylinder while the brakes are applied, a maintaining-chamber containing fluid at the brake-cylinder pressure, and a diaphragm exposed to pressure of said chamber for operating said valve.

14. In a fluid-pressure brake, the combination with a train-pipe, auxiliary reservoir, triple valve, and brake-cylinder, of a valve for controlling the supply of fluid to the brake-cylinder while the brakes are applied, a maintaining-chamber containing fluid at the brake-cylinder pressure, and a diaphragm subject to the opposing pressures of the brake-cylinder and said chamber for operating said valve.

15. In a fluid-pressure brake, the combination with a train-pipe, auxiliary reservoir, triple valve, and brake-cylinder, of a maintaining-chamber having means for charging same with brake-cylinder pressure when the brakes are applied and for closing said chamber, and means operated by the opposing pressures of the brake-cylinder and said chamber for controlling the supply of fluid to the brake-cylinder.

16. In a fluid-pressure brake, the combination with a train-pipe, auxiliary reservoir, triple valve, and brake-cylinder, of a maintaining-chamber having a valve-controlled equalizing-passage communicating with the brake-cylinder, and means operated by the opposing pressures of the brake-cylinder and said chamber for controlling the supply of fluid to the brake-cylinder.

17. In a fluid-pressure brake, the combination with a train-pipe, auxiliary reservoir, triple valve, and brake-cylinder, of a maintaining-chamber having an equalizing-passage communicating with the brake-cylinder, a valve controlling said passage, a diaphragm subject to the pressures of the brake-cylinder and said chamber for operating said valve, and another valve operated by said diaphragm for controlling the supply of fluid to the brake-cylinder.

18. In a fluid-pressure brake, the combination with a train-pipe, auxiliary reservoir, triple valve, and brake-cylinder, of a maintaining-chamber having means for charging the same with the desired brake-cylinder pressure, means subject to the opposing pressures of the brake-cylinder and said chamber for controlling the supply of fluid to the brake-cylinder while the brakes are applied, and mechanism for automatically releasing the fluid from said chamber when the brakes are released.

19. In a fluid-pressure brake, the combination with a train-pipe, auxiliary reservoir, triple valve and brake-cylinder, of a maintaining-chamber having means for charging the same with the desired brake-cylinder pressure, means subject to the opposing pressures of the brake-cylinder and said chamber for controlling the supply of fluid to the brake-cylinder while the brakes are applied, and means operated by the triple valve for releasing the fluid from said chamber.

20. In a fluid-pressure railway brake system, the combination with the main reservoir, train-pipe, and brake-cylinder, of means controlled by the pressure in the brake-cylinder for admitting air from the train-pipe to the brake-cylinder when the pressure in the latter falls below the amount predetermined in making the application of the brakes; and means controlled by the pressure in the train-pipe for admitting air from the main reservoir into the train-pipe when the pressure in the latter falls below the amount established in making the application of the brakes, substantially as described.

21. In a fluid-pressure railway brake system, the combination with the train-pipe and brake-cylinder; of means controlled by the pressure in the brake-cylinder for admitting air from the train-pipe to the brake-cylinder when the pressure in the latter falls below the amount determined in making the application of the brakes, substantially as described.

22. In a fluid-pressure brake system, the combination of the auxiliary reservoir, brake-cylinder, triple valve, and train-pipe; of a brake-cylinder-supply duct from the train-pipe to the brake-cylinder, a valve controlling the passage of fluid through said duct; and actuating means for said valve controlled by the pressure in the brake-cylinder, whereby said valve is opened when the brake-cylinder pressure falls below the predetermined amount and air is admitted from the train-pipe to restore the pressure in the brake-cylinder, substantially as described.

23. The combination with the train-pipe, auxiliary reservoir, brake-cylinder, and triple valve of an automatic air-brake apparatus, of a brake-cylinder-supply duct from the train-pipe to the brake-cylinder, and a valve controlling the passage of fluid therethrough, said valve being operated in response to changes in brake-cylinder pressure when communication between the auxiliary reservoir and brake-cylinder is shut off by the triple valve.

24. The combination of the main reservoir, engineer's valve, train-pipe, auxiliary reservoir, brake-cylinder, and triple valve of an automatic air-brake apparatus; with a brake-cylinder-supply duct from the train-pipe to the brake-cylinder, a valve controlling the passage of fluid therethrough, and means for actuating said valve responsive to reduction in brake-cylinder pressure when communication between the auxiliary reservoir and brake-cylinder is shut off by the triple valve; and a supply-duct from the main reservoir to the train-pipe and valve controlling the passage of fluid therethrough; and means for operating said valve responsive to reduction in train-pipe pressure when the vent from the train-pipe controlled by the engineer's valve is closed, substantially as described.

In testimony whereof I have hereunto set my hand.

WALTER V. TURNER.

Witnesses:
R. F. EMERY,
JAS. B. MACDONALD.